United States Patent
Zhang et al.

(10) Patent No.: US 12,216,227 B2
(45) Date of Patent: Feb. 4, 2025

(54) RADAR SYSTEM WITH SEQUENTIAL TWO-DIMENSIONAL ANGLE ESTIMATION

(71) Applicant: Aptiv Technologies AG, Schaffhausen (CH)

(72) Inventors: Xin Zhang, Agoura Hills, CA (US); Yujie Gu, Calabasas, CA (US); Zhengzheng Li, Agoura Hills, CA (US)

(73) Assignee: Aptiv Technologies AG, Schaffhausen (CH)

( * ) Notice: Subject to any disclaimer, the term of this patent is extended or adjusted under 35 U.S.C. 154(b) by 392 days.

(21) Appl. No.: 17/652,625

(22) Filed: Feb. 25, 2022

(65) Prior Publication Data
US 2023/0228845 A1    Jul. 20, 2023

Related U.S. Application Data

(60) Provisional application No. 63/266,936, filed on Jan. 19, 2022.

(51) Int. Cl.
*G01S 7/40*      (2006.01)
*G01S 13/42*     (2006.01)
(Continued)

(52) U.S. Cl.
CPC ............ *G01S 7/4021* (2013.01); *G01S 13/42* (2013.01); *G01S 13/878* (2013.01); *G01S 13/931* (2013.01); *H01Q 21/08* (2013.01)

(58) Field of Classification Search
CPC ...... G01S 7/4021; G01S 13/42; G01S 13/878; G01S 13/931; H01Q 21/08
See application file for complete search history.

(56) References Cited

U.S. PATENT DOCUMENTS

| 5,657,027 A | 8/1997 | Guymon |
| 7,474,262 B2 | 1/2009 | Alland |

(Continued)

FOREIGN PATENT DOCUMENTS

| CN | 106772224 A | 5/2017 |
| CN | 111239678 A | 6/2020 |

(Continued)

OTHER PUBLICATIONS

X. Zhang, Z. He, B. Liao, Y. Yang, J. Zhang and X. Zhang, "Flexible Array Response Control via Oblique Projection," in IEEE Transactions on Signal Processing, vol. 67, No. 12, pp. 3126-3139, Jun. 15, 2019, doi: 10.1109/TSP.2019.2912147 (Year: 2019).*

(Continued)

*Primary Examiner* — Bernarr E Gregory
*Assistant Examiner* — Juliana Cross
(74) *Attorney, Agent, or Firm* — Harness, Dickey & Pierce, P.L.C.

(57) ABSTRACT

This document describes techniques and systems of a radar system with sequential two-dimensional (2D) angle estimation. The radar system can efficiently estimate angles in two dimensions for detections. For example, a radar system includes a processor and an antenna that can receive electromagnetic energy reflected by one or more objects. The antenna includes a 2D array that includes antenna elements positioned in a first dimension and a second dimension. The processor can determine, using electromagnetic energy received by the 2D array, first angles in the first dimension associated with a detection of the one or more objects. The processor can then steer the 2D array to the first angle to generate a steered 1D array for each first angle. Using the steered 1D array, the processor can determine second angles associated with the first angle for the detection.

18 Claims, 8 Drawing Sheets

(51) Int. Cl.
  *G01S 13/87* (2006.01)
  *G01S 13/93* (2020.01)
  *G01S 13/931* (2020.01)
  *H01Q 21/08* (2006.01)

(56) References Cited

U.S. PATENT DOCUMENTS

| | | | |
|---|---|---|---|
| 7,639,171 | B2 | 12/2009 | Alland et al. |
| 9,395,727 | B1 | 7/2016 | Smith et al. |
| 9,869,762 | B1 | 1/2018 | Alland et al. |
| 10,416,680 | B2 | 9/2019 | Li et al. |
| 10,446,923 | B2 | 10/2019 | Watson |
| 10,809,737 | B2 | 10/2020 | Li et al. |
| 10,866,304 | B1 | 12/2020 | Hassibi et al. |
| 11,619,705 | B2 | 4/2023 | Zhang et al. |
| 11,635,506 | B2 | 4/2023 | Iwasa et al. |
| 2017/0104276 | A1* | 4/2017 | Vacanti ............... H01Q 21/065 |
| 2017/0149147 | A1 | 5/2017 | Minami et al. |
| 2018/0149736 | A1 | 5/2018 | Alland et al. |
| 2019/0285738 | A1 | 9/2019 | Iwasa et al. |
| 2019/0324133 | A1 | 10/2019 | Hong et al. |
| 2020/0004262 | A1 | 1/2020 | Li et al. |
| 2020/0256947 | A1 | 8/2020 | Motoda |
| 2020/0309899 | A1 | 10/2020 | Jonas et al. |
| 2021/0373127 | A1* | 12/2021 | Slobodyanyuk ......... G06F 17/16 |
| 2021/0373144 | A1 | 12/2021 | Amani et al. |
| 2022/0163623 | A1 | 5/2022 | Kishigami et al. |
| 2022/0236370 | A1 | 7/2022 | Li et al. |
| 2023/0152436 | A1* | 5/2023 | Sharma ..................... G01S 3/48 342/417 |

FOREIGN PATENT DOCUMENTS

| | | | |
|---|---|---|---|
| EP | 2662699 | A1 | 11/2013 |
| EP | 3757607 | A1 | 12/2020 |
| EP | 4036600 | A1 | 8/2022 |
| EP | 4043919 | A1 | 8/2022 |
| JP | 6523350 | B2 | 5/2019 |
| JP | 2020186972 | A | 11/2020 |
| WO | WO-2021096889 | A1 * | 5/2021 ............. G01S 13/86 |

OTHER PUBLICATIONS

Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, 2007, 2007, 4 pages.
Gu, et al., "Robust Adaptive Beamforming Based on Interference Covariance Matrix Reconstruction and Steering Vector Estimation", IEEE Transactions on Signal Processing, vol. 60, Issue: 7, Jul. 2012, 5 pages.
Haardt, et al., "Unitary ESPRIT: How to Obtain Increased Estimation Accuracy with a Reduced Computational Burden", May 1995, 1232-1242.
Kikuchi, et al., "Pair-Matching Method for Estimating 2-D Angle of Arrival With a Cross-Correlation Matrix", IEEE Antennas and Wireless Propagation Letters, vol. 5, pp. 35-40, 2006, Jan. 2007, 6 pages.
Moffet, "Minimum-Redundancy Linear Arrays", IEEE Transactions on Antennas and Propagation, vol. AP-16, No. 2., Mar. 1968, pp. 172-175.
Roy, et al., "ESPRIT-Estimation of Signal Parameters Via Rotational Invariance Techniques", Jul. 1989, pp. 984-995.
Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.
Vaidyanathan, et al., "Sparse Sensing with Co-Prime Samplers and Arrays", IEEE Trans. Signal Process., vol. 59, No. 2,, Feb. 2011, pp. 573-586.
Van Trees, "Planar Arrays and Apertures", Essay in "Detection, Estimation, and Modulation Theory, Optimum Array Processing", pp. 231-274. Wiley-Interscience, 2001., 2001, 44 pages.
Wang, et al., "Two-Dimensional Beamforming Automotive Radar with Orthogonal Linear Arrays", 2019 IEEE Radar Conference, Boston, MA, Apr. 22-26, 2019., 2019, 6 pages.
Zoltowski, et al., "Closed-Form 2-D Angle Estimation with Rectangular Arrays in Element Space or Beamspace via Unitary ESPRIT", Feb. 1996, pp. 316-328.
"Extended European Search Report", EP Application No. 23165460.9, Sep. 15, 2023, 16 pages.
Feger, et al., "A 77-GHz Fmcw Mimo Radar Based on an SiGe Single-Chip Transceiver", IEEE Transactions on Microwave Theory and Techniques, vol. 57, No. 5, May 2009, pp. 1020-1035.
Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.
Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.
"Extended European Search Report", EP Application No. 22200994.6, Aug. 11, 2023, 15 pages.
"Extended European Search Report", EP Application No. 23158330.3, Aug. 25, 2023, 17 pages.
Wu, et al., "A Low Complexity Adaptive Algorithm for Eigenspace-Based Two-Dimensional Direction of Arrival Tracking", IEICE Transactions on Fundamentals of Electronics, Communications and Computer Sciences, vol. E92-A, No. 8, Aug. 1, 2019, pp. 2097-2106.
"Extended European Search Report", EP Application No. 22197753.1, Mar. 7, 2023, 17 pages.
Zhang, et al., "Flexible Array Response Control via Oblique Projection", IEEE Transactions on Signal Processing, vol. 67, No. 12, Jun. 15, 2019, pp. 3126-3139.
"Extended European Search Report", EP Application No. 21196394.7, Mar. 4, 2022, 11 pages.
Amin, et al., "Sparse Arrays and Sampling for Interference Mitigation and DOA Estimation in GNSS" Proceedings of the IEEE, vol. 104, No. 6, Jun. 2016, pp. 1302-1317.
"Extended European Search Report", EP Application No. 21196393.9, Feb. 28, 2022, 11 pages.
"Extended European Search Report", EP Application No. 21215410.8, Jul. 12, 2022, 9 pages.
"Extended European Search Report", EP Application No. 21216322.4, Jun. 3, 2022, 9 pages.
Chen, et al., "A new method for joint DOD and DOA estimation in bistatic MIMO radar", Feb. 2010, pp. 714-718.
Engels, et al., "Automotive MIMO Radar Angle Estimation in the Presence of Multipath", Oct. 2017, 5 pages.
Gu, et al., "Adaptive Beamforming via Sparsity-Based Reconstruction of Covariance Matrix", Compressed Sensing in Radar Signal Processing, 2019, 33 pages.
Gu, et al., "Robust Adaptive Beamforming Based on Interference Covariance Matrix Sparse Reconstruction", Signal Processing, vol. 96, Mar. 1, 2014, pp. 375-381.
Jiang, et al., "Joint DOD and DOA Estimation for Bistatic MIMO Radar in Unknown Correlated Noise", Nov. 2015, 5113-5125.
Jin, "Joint DOD and DOA estimation for bistatic MIMO radar", Feb. 2009, pp. 244-251.
Pursuant to MPEP § 2001.6(b) the applicant brings the following co-pending application to the Examiner's attention: U.S. Appl. No. 17/075,632.
Steinwandt, et al., "Performance Analysis of ESPRIT—Type Algorithms for Co-Array Structures", Dec. 10, 2017, 5 pages.
Sun, et al., "MIMO Radar for Advanced Driver-Assistance Systems and Autonomous Driving: Advantages and challenges", Jul. 2020, pp. 98-117.
Msentin, et al., "Analysis of Multipath and DOA Detection Using a Fully Polarimetric Automotive Radar", Apr. 2018, 8 pages.
Zhou, et al., "A Robust and Efficient Algorithm for Coprime Array Adaptive Beamforming", IEEE Transactions on Vehicular Technology, vol. 67, No. 2, Feb. 2018, pp. 1099-1112.

(56) References Cited

OTHER PUBLICATIONS

Zoltowski, et al., "ESPRIT-Based 2-D Direction Finding with a Sparse Uniform Array of Electromagnetic Vector Sensors", Aug. 1, 2000, pp. 2195-2204.
Communication pursuant to Article 94(3) EPC regarding European Patent Application No. 22197753.1, dated Apr. 25, 2024.

* cited by examiner

RADAR SYSTEM WITH SEQUENTIAL TWO-DIMENSIONAL ANGLE ESTIMATION

CROSS-REFERENCE TO RELATED APPLICATION

This application claims the benefit under 35 U.S.C. 119(e) of U.S. Provisional Application No. 63/266,936, filed Jan. 19, 2022, the disclosure of which is incorporated in its entirety by reference herein.

BACKGROUND

Radar systems use antennas to transmit and receive electromagnetic (EM) signals for detecting and tracking objects. In automotive applications, radar antennas can include a two-dimensional (2D) array of elements to measure azimuth angles and elevation angles associated with the objects. Many assisted-driving and autonomous-driving systems (e.g., Level 4 or Level 5 autonomous systems) may require sophisticated radar sensors with high angular resolution and estimation accuracy in both the azimuth and elevation directions (e.g., to address over-drivable or under-drivable problems). Realizing a sufficiently high-performance 2D angle estimation may be too computationally complex or require computer hardware that is too expensive for some consumer vehicles.

SUMMARY

This document describes the techniques and systems of a radar system with sequential 2D angle estimation. Even with a 2D array of antenna elements, the described techniques enable an example radar system to estimate angles in two dimensions efficiently. For example, a radar system includes a processor and an antenna to receive electromagnetic energy reflected by one or more objects. The antenna includes a 2D array that provides antenna elements positioned in the first and second dimensions. Using electromagnetic energy received by the 2D array, the processor can determine first angles in the first dimension associated with detecting one or more objects. The processor can then steer the 2D array to the first angle to generate a steered 1D array for each first angle. Using the steered 1D array, the processor can determine second angles associated with the first angle for the detection. In this way, high angular resolution and estimation accuracy on first-dimension angles and second-dimension angles may be achieved without requiring expensive computer components, thereby enabling these techniques on a wide range of vehicles, e.g., from economy to luxury classes.

This document also describes methods performed by the above-summarized system and other configurations of the radar system set forth herein and means for performing these methods.

This Summary introduces simplified concepts related to a radar system with sequential 2D angle estimation, further described in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of a radar system with sequential 2D angle estimation are described in this document with reference to the following figures. The same numbers are often used throughout the drawings to reference like features and components.

DETAILED DESCRIPTION

Overview

Radar systems can be configured as an essential sensing technology that vehicle-based systems use to acquire information about the surrounding environment. For example, vehicle-based systems can use radar systems to detect objects in or near a roadway and, if necessary, take necessary actions (e.g., reduce speed, change lanes) to avoid a collision. Radar systems generally include antennas to transmit and receive EM radiation. Some radar systems have a receive antenna with a two-dimensional (2D) planar array of antenna elements to estimate the azimuth angles and the elevation angles associated with detections. The azimuth and elevation angles can be jointly calculated in such radar systems using 2D super-resolution algorithms (e.g., 2D non-linear least squares (NLS), 2D Estimation of Signal Parameters via Rotational Invariance Technique (ESPRIT), or 2D Multiple Signal Classification (MUSIC) algorithms). These 2D techniques are generally computationally expensive and inefficient. These radar systems can also independently estimate the azimuth and elevation angles and then use a pairing or matching process to select the most reliable azimuth-elevation combinations. However, this pairing or matching process still occurs in a 2D domain, resulting in computationally expensive and inefficient processes.

In contrast, this document describes techniques and systems to provide sequential angle estimation to support angle-estimation features in two dimensions, without requiring the computationally expensive and inefficient processes of previous techniques. For example, a radar system can include an antenna array with a 2D array. The 2D array includes multiple antenna elements positioned in a first dimension and a second dimension. Using EM energy received by the 2D array, the radar system determines the first angles associated with detections in the first dimension. For each first angle, the radar system then steers the 2D array to the respective first angle to generate a steered 1D array and determines, based on the steered 1D array, one or more second angles in the second dimension associated with the respective first angle. In this way, the computational complexity for the described radar system to estimate angles in two dimensions (e.g., azimuth and elevation angles) is improved. The described angle-finding technique can be applied to various configurations of the described 2D array.

This example is just one example of the described techniques and systems of a radar system with sequential 2D angle estimation. This document describes other examples and implementations.

Operating Environment

Figure 1:
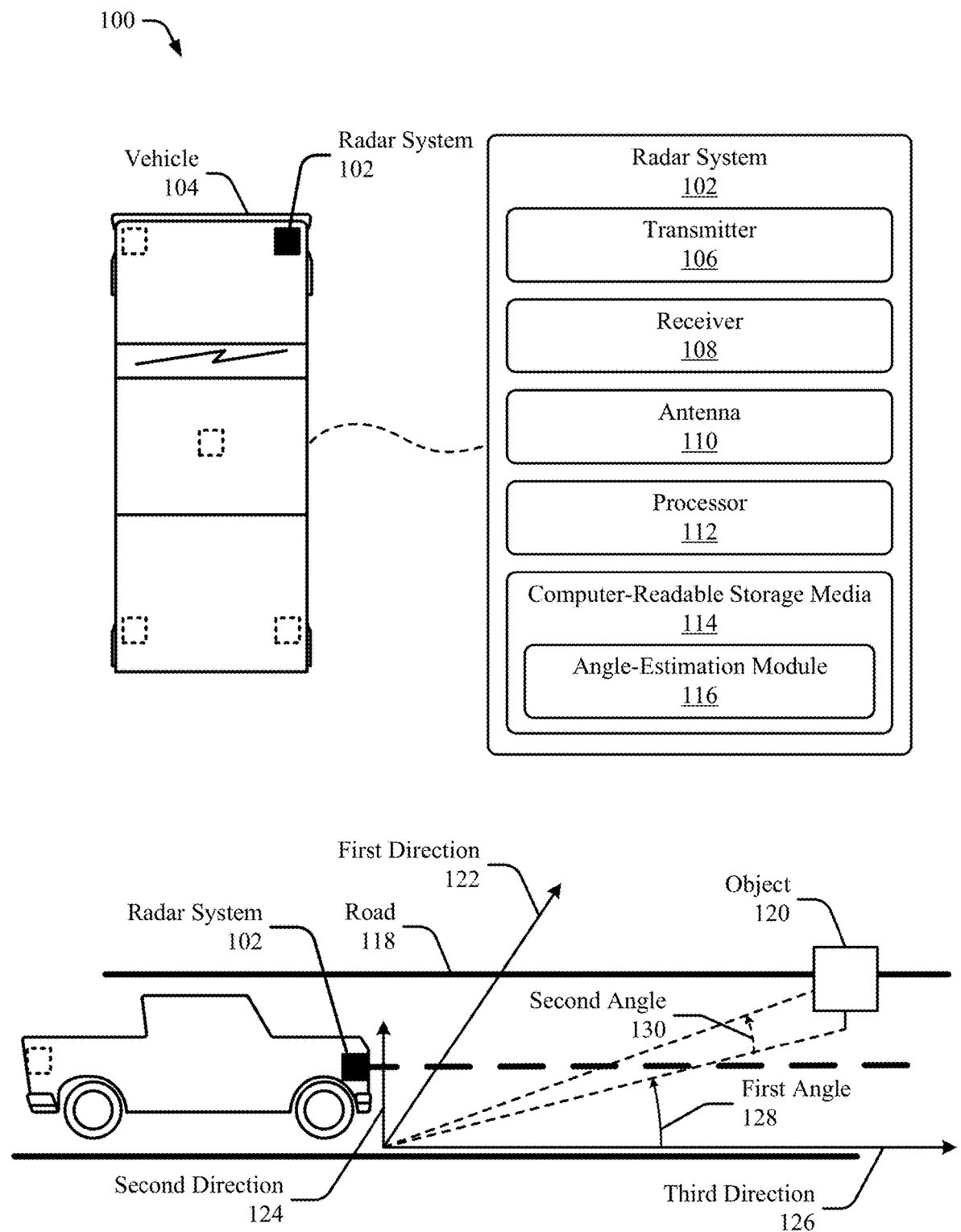
FIG. 1 illustrates an example environment in which a radar system with sequential 2D angle estimation can be implemented.

FIG. 1 illustrates an example environment 100 in which a radar system 102 with sequential 2D angle estimation can be implemented. In the depicted environment 100, the radar system 102 is mounted to, or integrated within, a vehicle 104. The radar system 102 can detect one or more objects 120 in the vicinity of the vehicle 104. Although illustrated as a car, the vehicle 104 can represent other types of motorized vehicles (e.g., an automobile, a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 102 to any moving platform, including moving machinery or robotic equipment.

In the depicted implementation, the radar system 102 is mounted on the front of the vehicle 104 and illuminates the object 120. The radar system 102 can detect the object 120 from any exterior surface of the vehicle 104. For example, the radar system 102 can be integrated into a bumper, side mirror, headlights, rear lights, or any other interior or exterior location where the object 120 requires detection. In some cases, the vehicle 104 includes multiple radar systems 102, such as a first radar system 102 and a second radar system 102, that provide a larger instrument field-of-view. In general, the radar system 102 can be designed to have parts of the radar system 102 distributed at different locations of the vehicle 104 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The object 120 is composed of one or more materials that reflect radar signals. The object 120 can represent a target of interest depending on the application. In some cases, the object 120 can be a moving object (e.g., another vehicle) or a stationary object (e.g., a roadside sign).

The radar system 102 emits EM radiation by transmitting EM signals or waveforms via antenna elements. In environment 100, the radar system 102 can detect and track the object 120 by transmitting and receiving one or more radar signals. For example, the radar system 102 can transmit EM signals between 100 and 400 gigahertz (GHz), between 4 and 100 GHz, or between approximately 70 and 80 GHz.

The radar system 102 can include a transmitter 106 and at least one antenna 110 to transmit EM signals. The radar system 102 can also include a receiver 108 and the at least one antenna 110 to receive reflected versions of the EM signals. The transmitter 106 includes one or more components for emitting the EM signals. The receiver 108 includes one or more components for detecting the reflected EM signals. The transmitter 106 and the receiver 108 can be incorporated together on the same integrated circuit (e.g., a transceiver integrated circuit) or separately on different integrated circuits. In other implementations, the radar system 102 does not include a separate antenna 110, but the transmitter 106 and the receiver 108 each have an antenna or antenna elements.

The radar system 102 also includes one or more processors 112 (e.g., an energy processing unit) and computer-readable storage media (CRM) 114. The processor 112 can be a microprocessor or a system-on-chip. The processor 112 can execute computer-executable instructions stored in the CRM 114. For example, the processor 112 can process EM energy received by the antenna 110 and determine, using an angle-estimation module 116, a location of the object 120 relative to the radar system 102. The processor 112 can also generate radar data for at least one automotive system. For example, the processor 112 can control, based on processed EM energy from the antenna 110, an autonomous or semi-autonomous driving system of the vehicle 104.

The angle-estimation module 116 obtains EM energy received by the antenna 110 or the receiver 108 and determines angles associated with the object 120 along a first dimension and a second dimension. The angle-estimation module 116 can be implemented as instructions in the CRM 114, hardware, software, or a combination thereof executed by the processor 112.

The radar system 102 can determine a distance to the object 120 based on the time it takes for the EM signals to travel from the radar system 102 to the object 120 and from the object 120 back to the radar system 102. The radar system 102 can also determine, using the angle-estimation module 116, a location of the object 120 in terms of a first angle 128 (e.g., azimuth angle) and a second angle 130 (e.g., elevation angle) based on the direction of a maximum-amplitude echo signal received by the radar system 102.

For example, FIG. 1 illustrates the vehicle 104 traveling on a road 118. The radar system 102 detects the object 120 in front of the vehicle 104. The radar system 102 can define a coordinate system with the first direction 122 (e.g., along a surface of the road 118 and perpendicular to a travel path of the vehicle 104), the second direction 124 (e.g., perpendicular to the surface of the road 118), and a third direction 126 (e.g., in a forward direction along the road 118). The radar system 102 can locate the object 120 in terms of the first angle 128 and the second angle 130. The first angle 128 can represent a horizontal angle from the third direction 122 to the object 120. The second angle 130 can represent a vertical angle from the surface of the road 118 (e.g., a plane defined by the first direction 122 and the third direction 126) to the object 120.

The vehicle 104 can also include at least one automotive system that relies on data from the radar system 102, such as a driver-assistance system, an autonomous-driving system, or a semi-autonomous-driving system. The radar system 102 can include an interface to an automotive system that relies on the data. For example, the processor 112 outputs, via the interface, a signal based on EM energy received by the receiver 108 or the antenna 110.

Generally, the automotive systems use radar data provided by the radar system 102 to perform a function. For example, the driver-assistance system can provide blind-spot monitoring and generate an alert that indicates a potential collision with the object 120 detected by the radar system 102. The radar data from the radar system 102 indicates when it is safe or unsafe to change lanes in such an implementation. The autonomous-driving system may move the vehicle 104 to a particular location on the road 118 while avoiding collisions with the object 120 detected by the radar system 102. The radar data provided by the radar system 102 can provide information about the distance to and the location of the object 120 to enable the autonomous-driving system to perform emergency braking, perform a lane change, or adjust the speed of the vehicle 104.

Example Antenna Configurations

FIGS. 2A through 2F illustrate example antennas 200 for performing sequential 2D angle estimation. The antennas 200 (e.g., antenna 200-1, 200-2, 200-3, 200-4, 200-5, 200-6)

are examples of the antenna 110 of the radar system 102 in FIG. 1 with similar components.

The antennas 200 include multiple antenna elements 206. The antenna elements 206 represent physical locations or phase-center locations of portions of a 2D array 204, a one-dimensional (1D) array 216, or a concatenated 1D array 218. The antenna elements 206 can also represent synthetic locations or phase-center locations of components of the antennas 200 formed by multiple-input and multiple-output (MIMO) techniques.

Fixed to a printed circuit board (PCB) 202, the antennas 200 include the 2D array 204 with antenna elements 206 in a first dimension 208 (e.g., an azimuth direction 212) and a second dimension 210 (e.g., an elevation direction 214). The antennas 200 can be fabricated with different materials, components, and techniques in other implementations. For example, the antennas 200 can include a lens antenna, a metalized plastic antenna, a dish antenna, a horn antenna, or a combination thereof.

The second dimension 210 can be orthogonal to the first dimension 208. For example, in FIGS. 2A, 2B, 2C, 2D, and 2F, the second dimension 210 is orthogonal to the first dimension 208. However, in FIG. 2E, the second dimension 210 is not orthogonal to the first dimension 208. As described in greater detail with respect to FIGS. 4 and 5, the angle-estimation module 116 can determine second angles in the second dimension 210 if the relative placement of the antenna elements 206 is known, even if the second dimension 210 is not orthogonal to the first dimension 208.

Figure 2A:
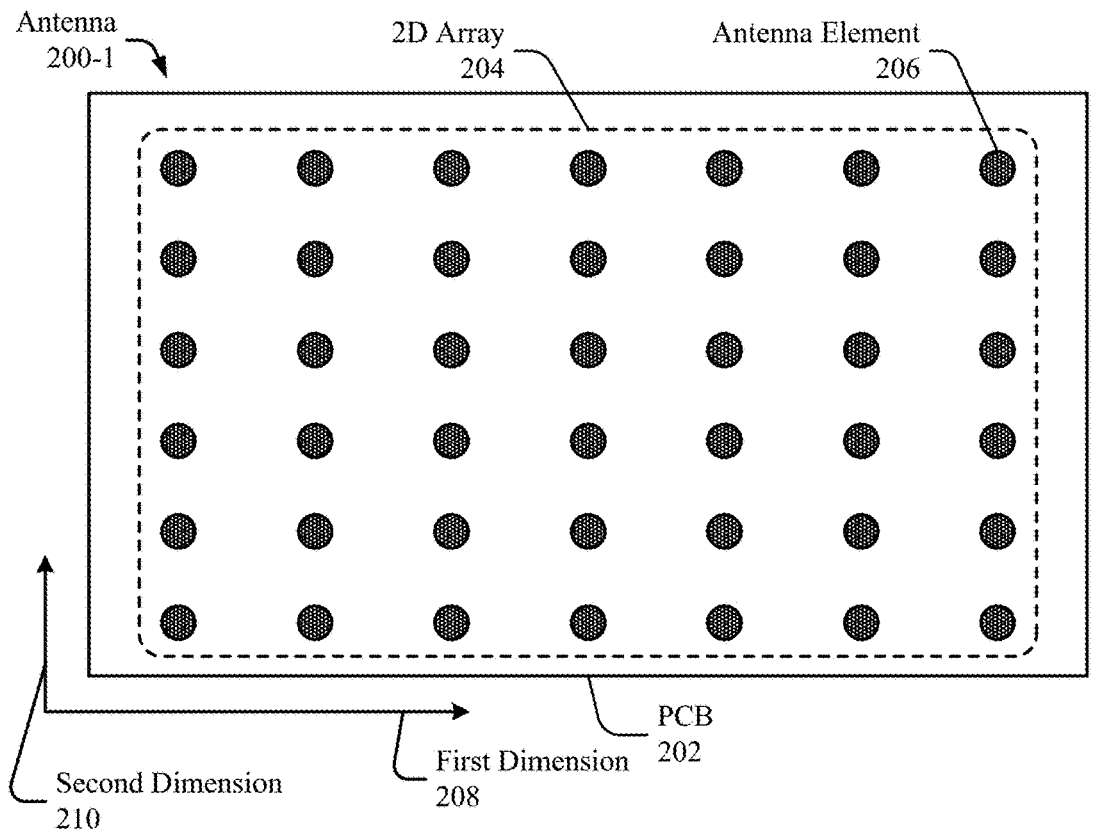
FIGS. 2A through 2F illustrate example antennas for performing sequential 2D angle estimation.
Figure 2B:
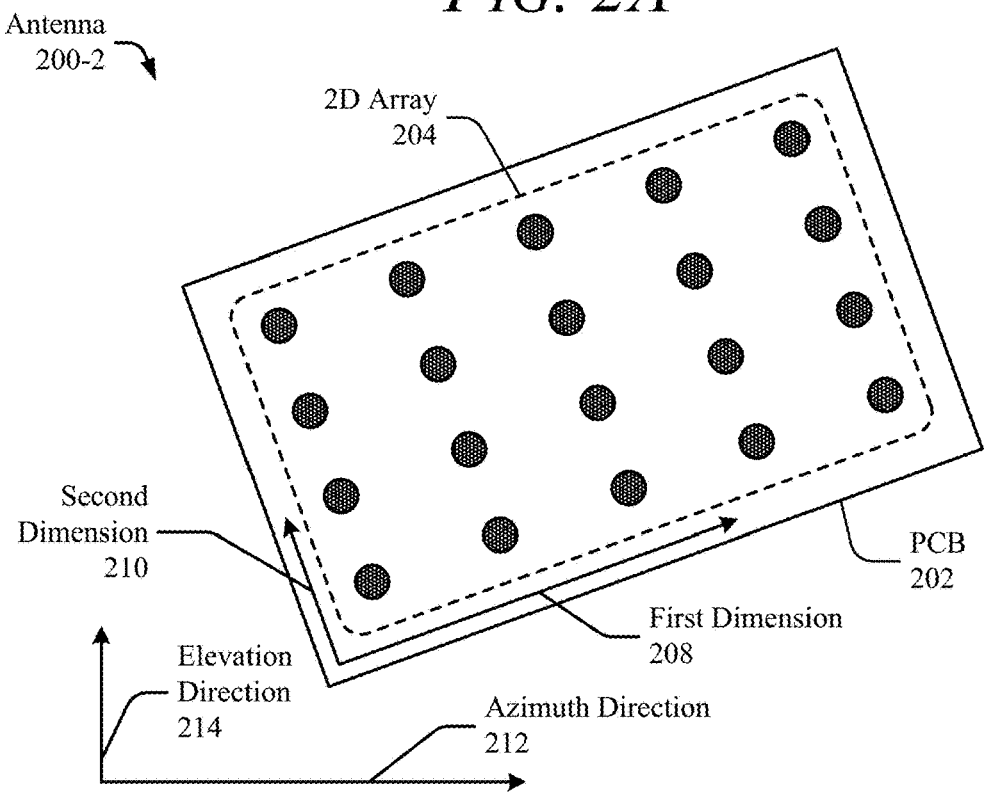

In addition, the first dimension 208 and the second dimension 210 can correspond to the azimuth direction 212 and the elevation direction 214 (as illustrated in FIG. 2A), respectively, or vice versa. In other implementations, the first dimension 208 and the second dimension 210 can be rotated at an angle relative to the azimuth direction 212 and the elevation direction 214.

The antenna elements 206 of the 2D arrays 204 can be arranged in an approximately rectangular shape, as illustrated in FIGS. 2A, 2B, 2C, and 2D. In other implementations, the antenna elements 206 of the 2D array 204 can be arranged in an approximately rhombus shape, as illustrated in FIG. 2E with the second dimension 210 not being orthogonal to the first dimension 208. In yet other implementations, the antenna elements 206 of the 2D array 204 in the first dimension 208 can be unaligned from the antenna elements 206 in the second dimension 210, as illustrated in FIG. 2F. The antenna elements 206 of the 2D arrays 204 can also be arranged in a two-dimensional sparse array, as illustrated in FIGS. 2A through 2F. The 2D array 204 is generally a sparse 2D array that includes at least four antenna elements 206. The antenna elements 206 are spaced apart by a first distance in the first dimension 208 and a second distance in the second dimension 210. In other words, the 2D array 204 can be a uniform 2D array.

Figure 2C:
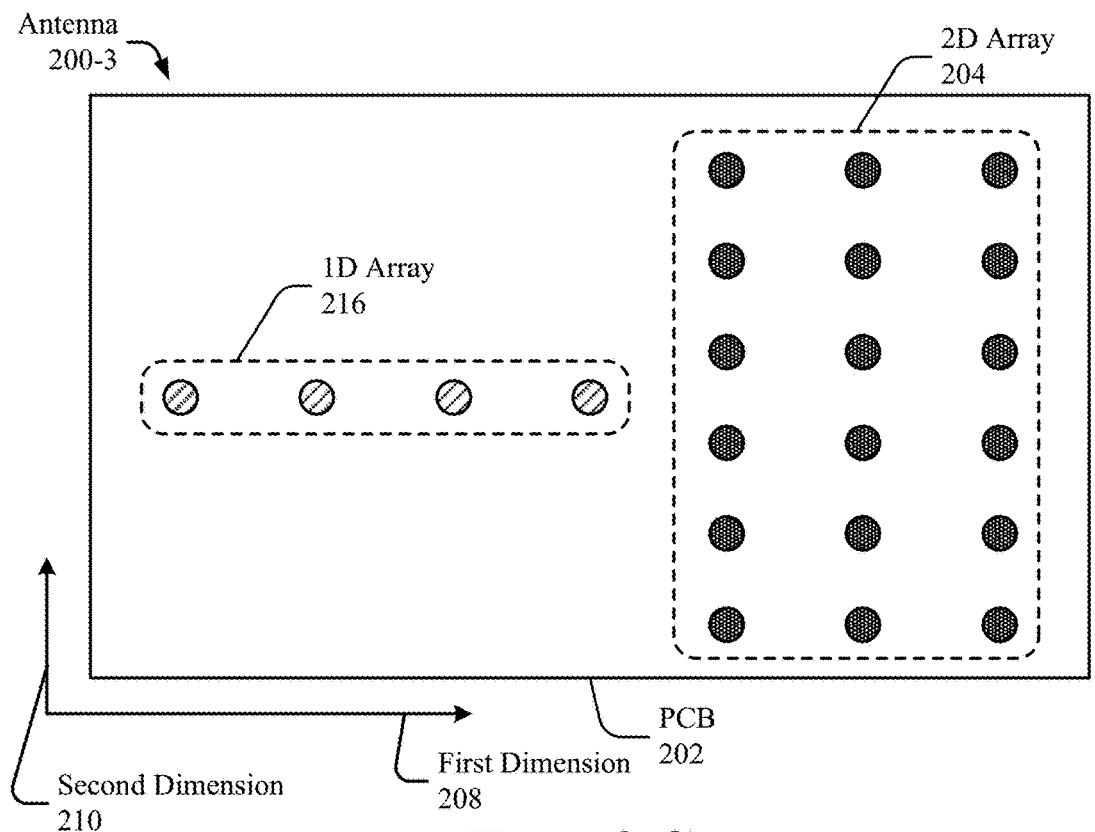
Figure 2D:
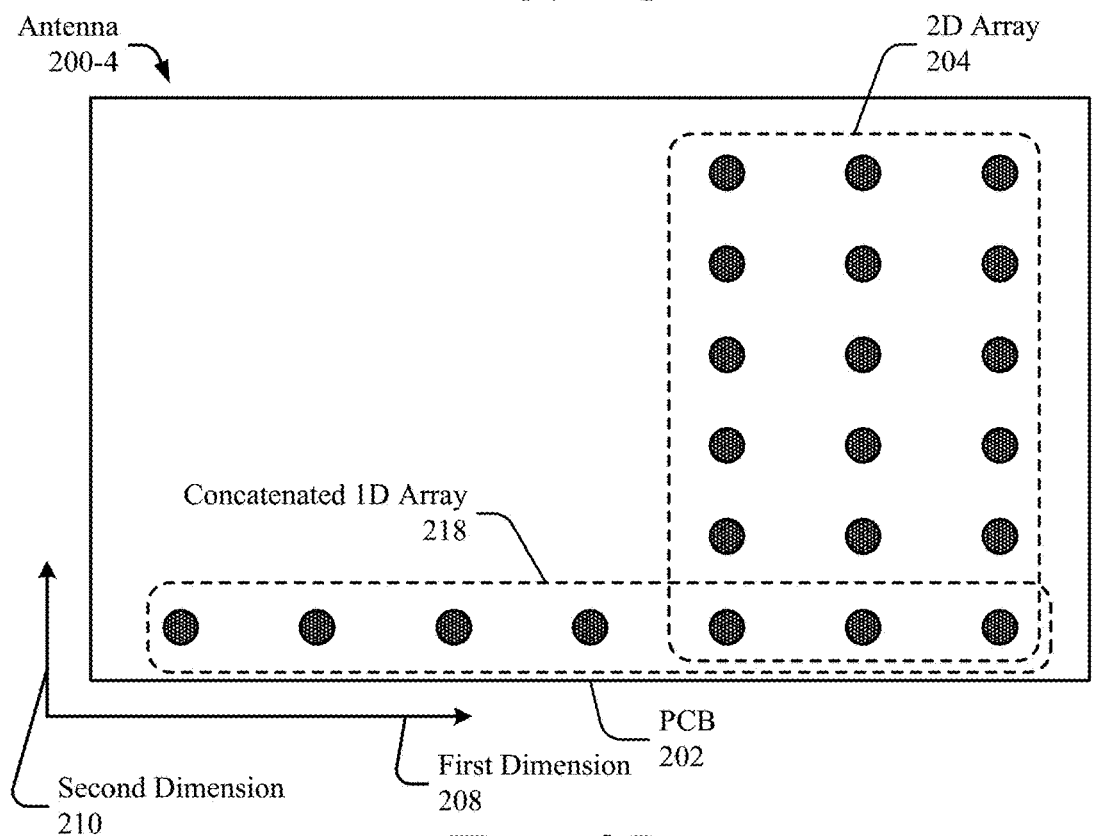
Figure 2E:
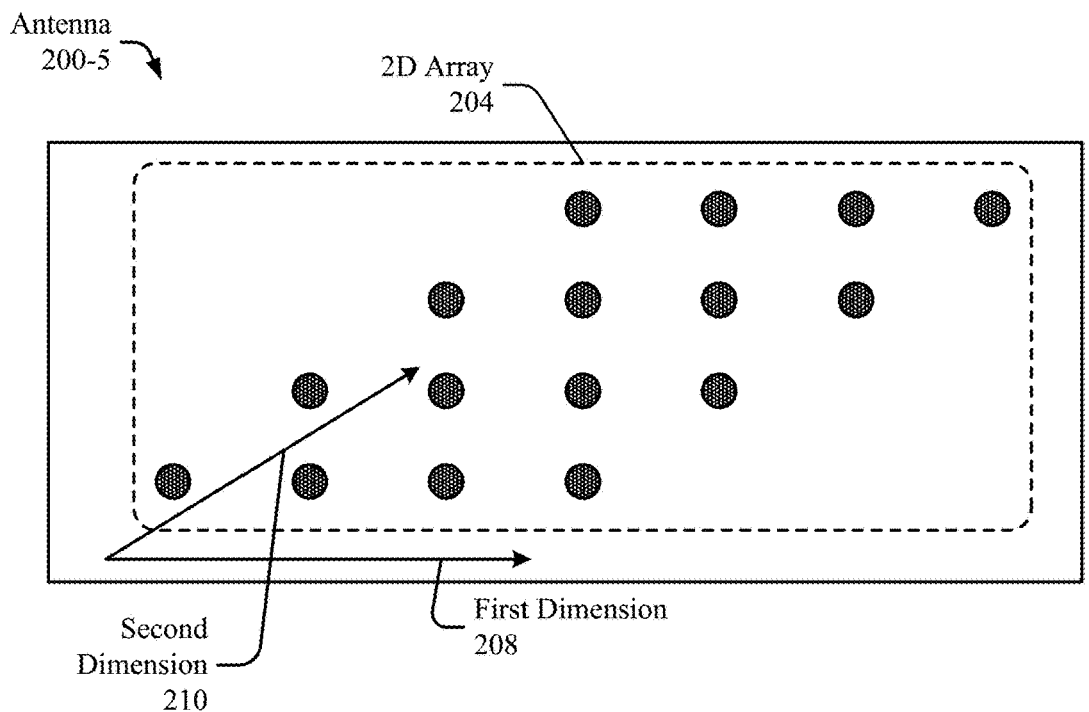
Figure 2F:
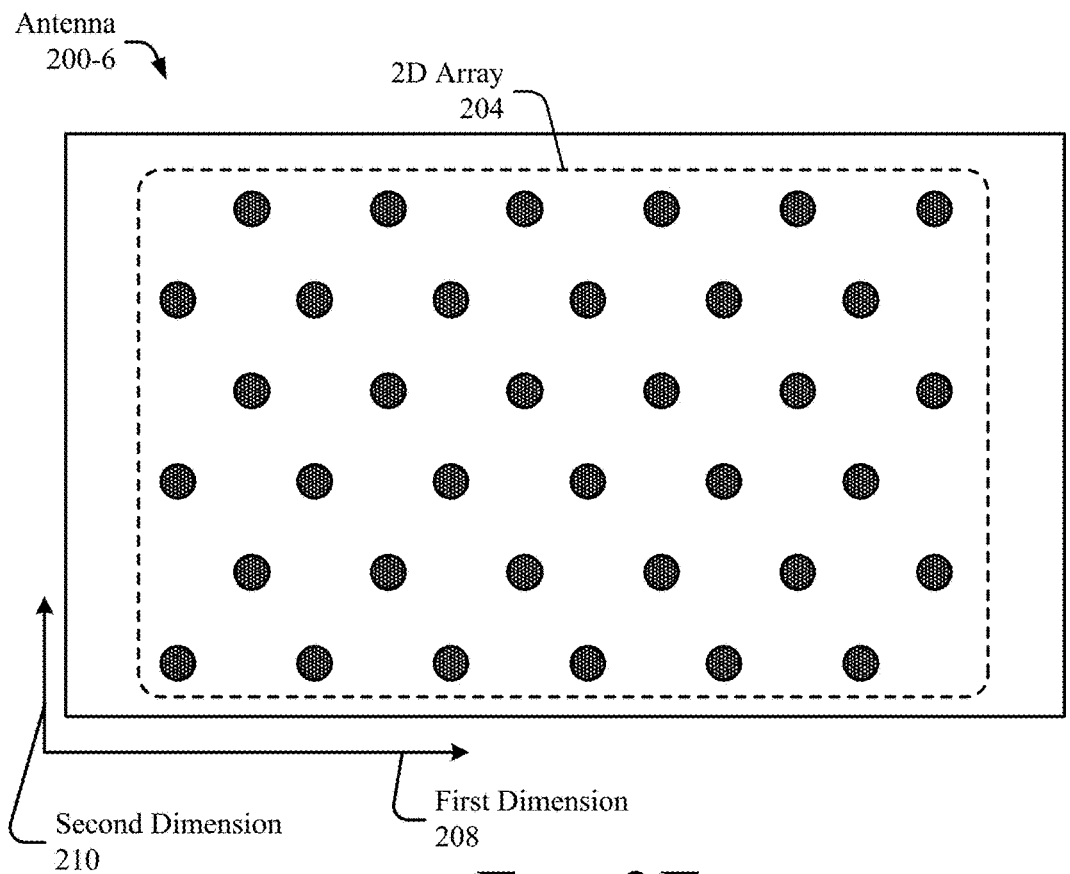

The antenna 200 can also include a 1D array (e.g., the 1D array 216 of FIG. 2C and the concatenated 1D array 218 of FIG. 2D). The 1D array can be specifically designed for first-dimension angle or first angle estimation. For example, the 1D array 216 can have an aperture or antenna-element spacing to obtain a desired resolution or accuracy for first-dimension angle estimation. To increase the aperture of the 1D array, the antenna 200-4 of FIG. 2D includes the concatenated 1D array 218 that increases the aperture of a subset of the 2D array 204 to improve the resolution of estimating first angles in the first dimension 208.

The 1D array 216 and the concatenated 1D array 218 are positioned in the first dimension 208 or an azimuth direction in the depicted implementations. In other implementations, the 1D array 216 and the concatenated 1D array 218 can be positioned in the second dimension 210, an elevation direction, or another direction. In the depicted implementations, the 1D array 216 and the concatenated 1D array 218 are positioned to the side of the 2D array 204. In other implementations, the 1D array 216 and the concatenated 1D array 218 can be positioned below or above the 2D array 204. For example, the 1D array 216, the concatenated 1D array 218, and the 2D array 204 can be configured or arranged in an approximately T-shape, an approximately upside-down T-shape, or an approximately cross shape.

The 1D array 216 and the concatenated 1D array 218 can be sparse linear arrays that include multiple antenna elements 206. The antenna elements 206 can be spaced apart by a specific distance, resulting in a uniform linear array. The arrangement of the 1D array 216, the concatenated 1D array 218, and the 2D array 204 can be chosen based on the position and configuration of other components in the radar system 102.

In operation, the antennas 200 can receive EM energy reflected by one or more objects 120. As described with respect to FIGS. 3 through 6, the angle-estimation module 116 uses the 1D array 216, the concatenated 1D array 218, or subarrays of the 2D array 204 in the first dimension 208 to estimate first angles in the first dimension 208 for one or more detections. The angle-estimation module 116 then steers the 2D array 204 to a particular first angle to determine second angles in the second dimension 210 associated with the respective first angle.

The 1D array 216, the concatenated 1D array 218, and the 2D array 204 include multiple antenna elements 206. The 1D array 216 and the concatenated 1D array 218 can include L antenna elements 206. The 2D array 204 can include M antenna elements 206 (e.g., at least four) in the first dimension 208 and N antenna elements 206 in the second dimension 210. In automotive applications, the number, M×N, of antenna elements 206 in the 2D array 204 can be greater than an anticipated maximum number of objects 120 to be detected by the radar system 102. The 2D array 204 generally includes at least four antenna elements 206 not encompassed by the 1D array 216 or the concatenated 1D array 218.

The 1D array 216, the concatenated 1D array 218, and the 2D array 204 can be planar arrays that provide high gain and low loss. Planar arrays are well-suited for vehicle integration due to their small size. For example, the antenna elements 206 can be slots etched or otherwise formed in a plating material of one surface of the PCB 202 for a substrate-integrated waveguide (SIW) antenna. As another example, the antenna elements 206 can be radiation slots of a waveguide antenna built with metalized plastic and/or metal. The antenna elements 206 can also be part of an aperture antenna, a microstrip antenna, or a dipole antenna. For example, the 1D array 216, the concatenated 1D array 218, and the 2D array 204 can include subarrays of patch elements (e.g., microstrip patch antenna subarrays) or dipole elements.

Example Angle-Estimation Techniques

Figure 3:
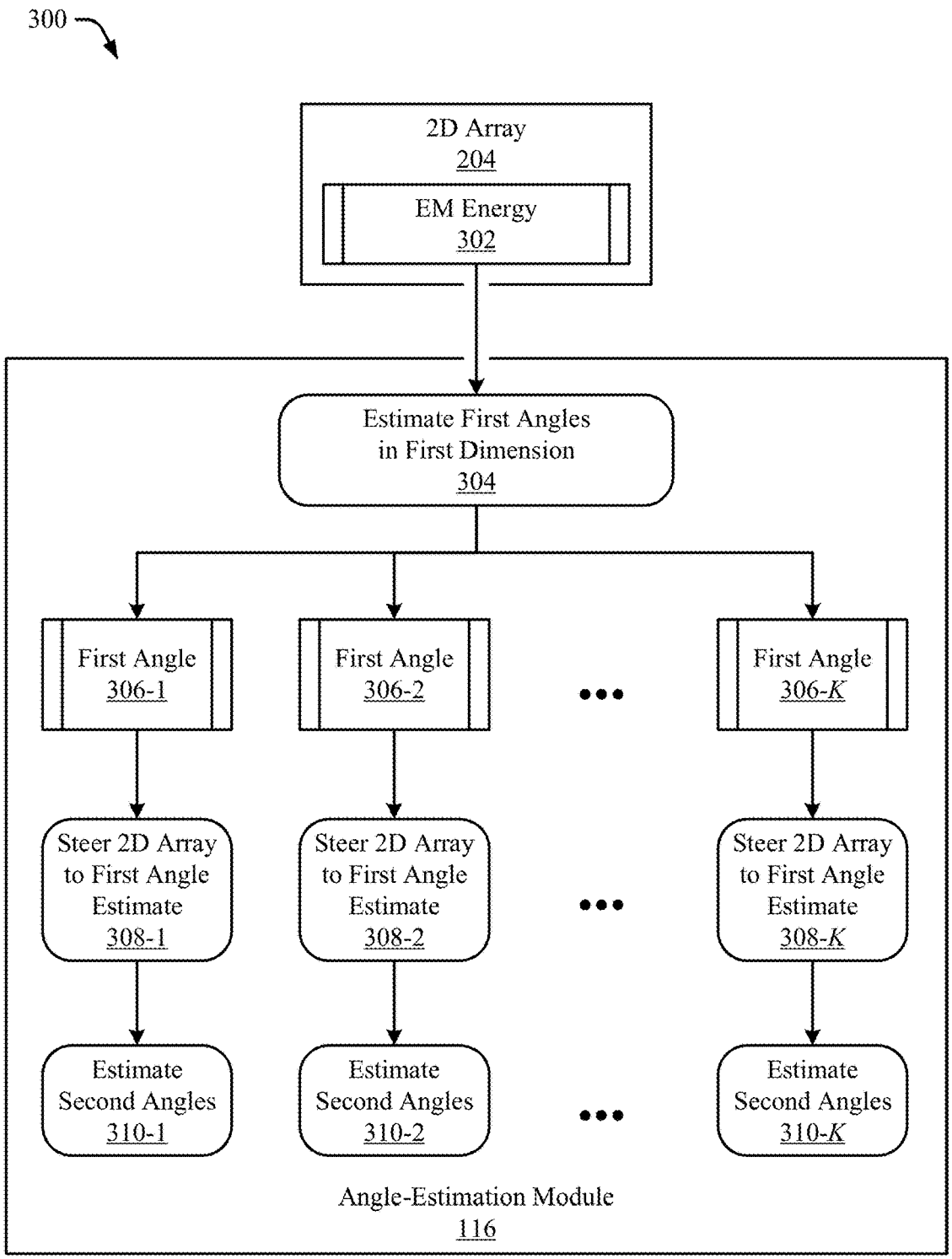
FIG. 3 illustrates an example conceptual diagram of an angle-estimation module to perform sequential 2D angle estimation.

FIG. 3 illustrates an example conceptual diagram 300 of the angle-estimation module to perform sequential 2D angle estimation. The radar system and angle-estimation module of FIG. 3 can, for example, be the radar system 102 and angle-estimation module 116 of FIG. 1. The radar system 102 includes the 2D array 204, which can include a variety of configurations, including the configurations illustrated in FIGS. 2A through 2F.

At 304, the angle-estimation module 116 obtains EM energy 302 received by the 2D array 204 and estimates first angles 306-1, 306-2, ... 306-K, $\theta_1, \theta_2, \ldots, \theta_K$, associated with detections of one or more objects 120, where K represents the number of detections. The angle-estimation module 116 obtains the EM energy 302 received by the 1D array 216 of FIG. 2C or the concatenated 1D array 218 of FIG. 2D in other implementations. The EM energy 302 can be digitally sampled EM energy received by the 2D array 204, the 1D array 216, or the concatenated 1D array 218. The angle-estimation module 116 can use various angle-finding functions to determine the first angle estimates 306 from the EM energy 302. As non-limiting examples, the angle-estimation module 116 can use a MUSIC, ESPRIT, or a non-linear least squares (NLS) technique to estimate the direction of arrival of the EM signals received by the 2D array 204, the 1D array 216, or the concatenated 1D array 218. The angle-estimation module 116 can also use a pseudo-spectrum function, including a Space-Alternating Generalized Expectation-maximization (SAGE), Delay-and-Sum (DS), and/or Minimum Variance Distortionless Response (MVDR) based-function, to estimate the first angles 306. As another example, the angle-estimation module 116 can use fast Fourier transform (FFT) beamforming to estimate the first angle 306. The angle-estimation module 116 can determine the first angle estimates with relatively low processing complexity and cost.

At 308 (e.g., operations 308-1, 308-2, ..., 308-K), the angle-estimation module 116 steers the 2D array 204 to each first angle 306, $\theta_k$ ($\forall k=1, 2, \ldots, K$). As described in greater detail with reference to FIGS. 4 and 5, the angle-estimation module 116 can use several techniques to steer the 2D array 204 to generate a steered 1D array for a respective first-angle estimate. The angle-estimation module 116 can use the steered 1D array to determine second-dimension information, $z_k$, associated with each first angle 306, $\theta_k$. The angle-estimation module 116 performs or repeats operation 308 (e.g., operation 308-1, 308-2, ..., 308-K) until each first angle 306 from operation 304 is analyzed. The angle-estimation module 116 can perform operations 308 sequentially or simultaneously. By steering the 2D array 204 to each first angle 306, subsequent second angle estimates are exclusively paired with the respective first angle 306. In this way, the angle-estimation module 116 does not need to perform a different technique or operation to associate second angle estimates with the first angles 306.

At 310 (e.g., operations 310-1, 310-2, ..., 310-K), the angle-estimation module 116 estimates second angles, $\emptyset_1, \emptyset_2, \ldots, \emptyset_K$, associated with the detections, where K represents the number of detections. The angles can be denoted in array notation as:

$(\theta_1, \phi_1)$, $(\theta_1, \phi'_1)$, ..., $(\theta_2, \phi_2)$, $(\theta_2, \phi'_2)$, ...,

...

$(\theta_K, \phi_K)$, $(\theta_K, \phi'_K)$, ...

Using the vector $z_k$, the angle-estimation module 116 estimates the second angles using a single-snapshot approach, including phase compare, fast Fourier transform (FFT), and NLS techniques. The described techniques to perform sequential 2D angle estimation allow the angle-estimation module 116 to operate on 2D arrays where the second dimension 210 is not orthogonal to the first dimension 208 (as illustrated in FIG. 2E). Because the second dimension 210 is coupled with the first dimension 208 in the vector $z_k$, the first-dimension information is compensated for as long as the relative position of the subarrays in the 2D array 204 is known. For similar reasons, the angle-estimation module 116 can use the described techniques to estimate the second angles even if the subarrays of the 2D array 204 are not aligned along the second dimension 210 (as illustrated in FIG. 2F).

Figure 4:
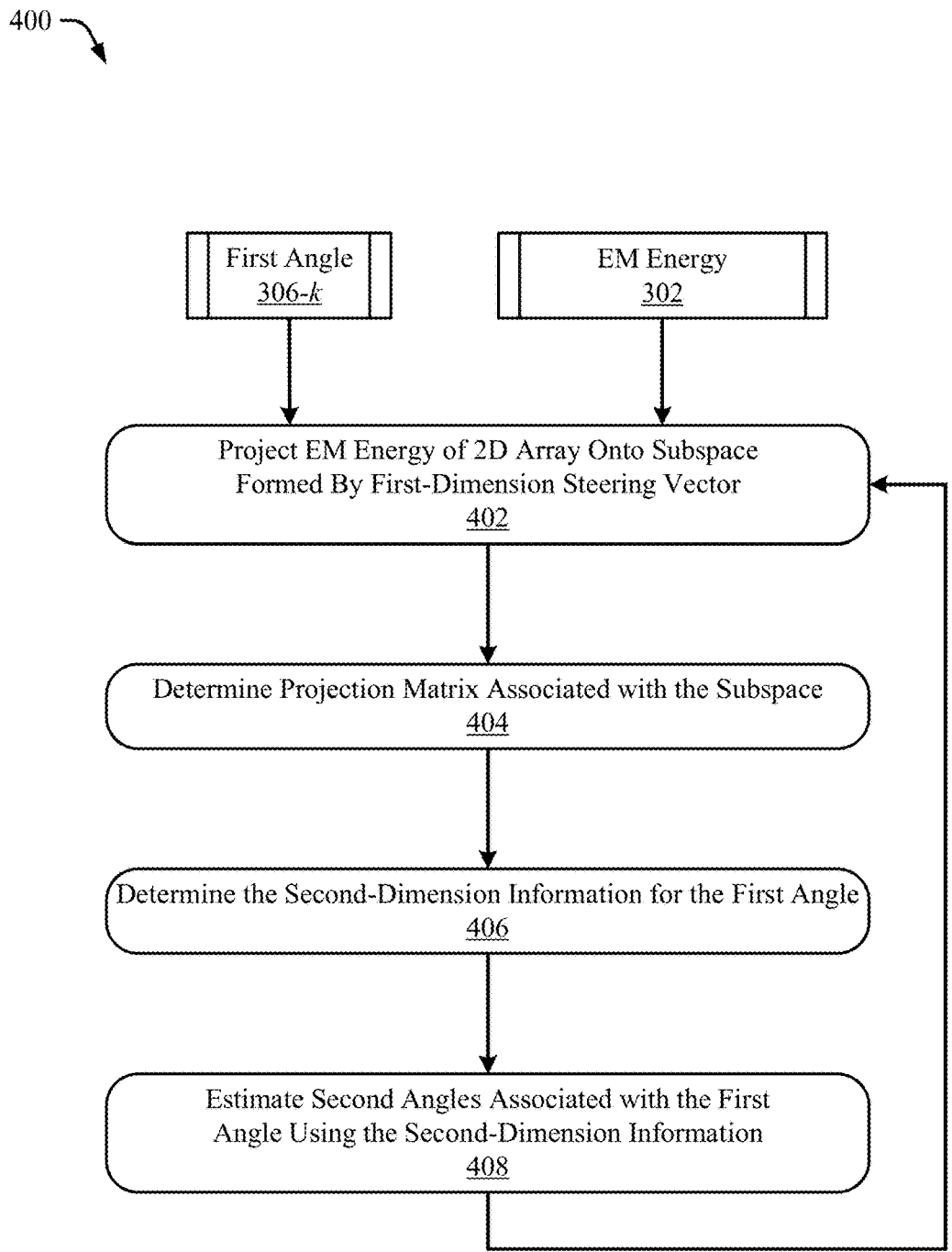
FIG. 4 illustrates an example conceptual diagram of an angle-estimation module estimating second angles by using a projection-based technique to steer a 2D array.

FIG. 4 illustrates an example conceptual diagram 400 of an angle-estimation module estimating second angles using a projection-based technique to steer the 2D array. The angle-estimation module of FIG. 4 can be the angle-estimation module 116 of FIGS. 1 and 3. As described with respect to FIG. 3, the angle-estimation module 116 determines the first angles 306 associated with detections of the objects 120. Inputs to the conceptual diagram 400 include each first angle 306 (e.g., first angle 306-k) and the EM energy 302.

At 402, the angle-estimation module 116 can project the 2D array 204 onto a subspace formed by a first-dimension steering vector associated with the first angle 306-k, $\theta_k$. The k-th projected 2D array is associated with the first angle 306-k, $\theta_k$, and any second-dimension information obtained from the projected 2D array is associated with the first angle 306-k, $\theta_k$.

In implementations where each subarray along the first dimension 208 in the 2D array 204 is a uniform linear array (ULA) with M antenna elements 206 (e.g., M> the number of detections, K) equally spaced by a first distance, $d_1$, the angle-estimation module 116 can generate a first-dimension steering vector for the first angle 306-k, $\theta_k$, represented by Equation (1):

$$s_k = [1, e^{j2\pi\mu k}, \ldots, e^{j2\pi(M-1)\mu k}]^T \in \mathbb{C}^M \quad (1)$$

where $\mu k = d_1 \sin \theta_k / \lambda$, and $\lambda$ is the wavelength of radar signal.

At 404, the angle-estimation module 116 can determine a projection matrix associated with the subspace formed by the steering vector, $s_k$. The projection matrix can be determined using Equation (2):

$$P_k = s_k(s_k^H s_k)^{-1} s_k^H = s_k s_k^H / M \quad (2)$$

The EM energy 302, which represents the original 2D array data, can denoted by Equation (3):

$$Y = [y_1, y_2, \ldots, y_N] \in \mathbb{C}^{M \times N} \quad (3)$$

where $y_n \in \mathbb{C}^M$ (n=1, 2, ..., N) is the data from the n-th subarray along the first dimension 208. The projected 2D array associated with $\theta_k$ is represented by Equation (4):

$$Y_k = P_k * Y = [P_k y_1, P_k y_2, \ldots, P_k y_N] = \frac{s_k}{M} * [s_k^H y_1, s_k^H y_2, \ldots, s_k^H y_N] \quad (4)$$

The variable M represents the number of antenna elements 206 in the n-th subarray along the first dimension 208 and is a constant. The steering vector, $s_k$, relates to the first angle 306-k, $\theta_k$. Based on these observations, the angle-estimation module 116 can determine the second-dimension information, $z_k$, associated with the first angle 306-k, $\theta_k$, using Equation (5):

$$z_k = [s_k^H y_1, s_k^H y_2, \ldots, s_k^H y_N]^T \in \mathbb{C}^N \quad (5)$$

At 406, the angle-estimation module 116 can determine the second-dimension information, $z_k$, at a spatial frequency of the discrete Fourier Transform spectrum. The n-th element of the second-dimension information, $z_k$, can be rewritten using the first-dimension steering vector $s_k$, as illustrated in Equation (6):

$$z_{k,n} = s_k^H y_n = \sum_{m=1}^{M} e^{-j2\pi(m-1)\mu_k} * y_{n,m} \tag{6}$$

where $y_{n,m}$ represents the data observed by the m-th element of the n-th subarray of the 2D array 204 along the first dimension 208.

At 408, the angle-estimation module 116 estimates second angles, $\emptyset_k, \emptyset'_k, \ldots, \emptyset'''_k$, associated with the first angle 306-k, $\theta_k$. Using the second-dimension information, $z_k$, the angle-estimation module 116 estimates the second angles using a single-snapshot approach, including phase compare, FFT, and NLS techniques.

Figure 5:
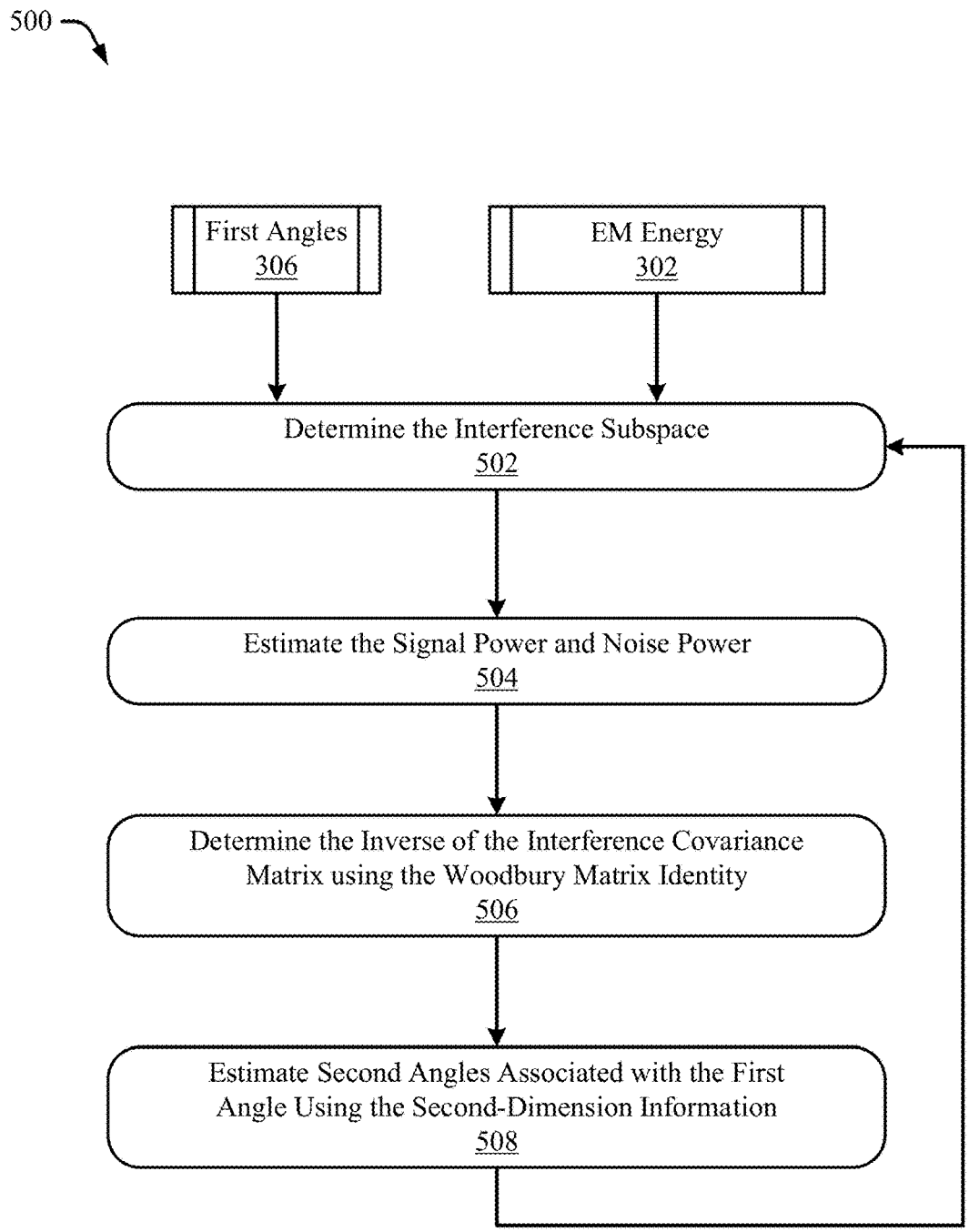
FIG. 5 illustrates an example conceptual diagram of an angle-estimation module estimating second angles by using a beamforming-based technique to steer a 2D array.

FIG. 5 illustrates an example conceptual diagram 500 of an angle-estimation module estimating second angles by using a beamforming-based technique to steer the 2D array. The angle-estimation module of FIG. 5 can be the angle-estimation module 116 of FIGS. 1 and 3. As described with respect to FIG. 3, the angle-estimation module 116 determines the first angles 306 associated with detections of the objects 120. Inputs to the conceptual diagram 500 include each first angle 306 (e.g., first angle 306-k) and the EM energy 302.

It is observed that the vector element $z_{k,n}$ in Equation (6) represents the sample value at spatial frequency $\mu_k$ of the discrete Fourier transform (DFT) spectrum of $y_n$. In terms of beamforming theory, the second-dimension information, $z_k$, is obtained by beamforming the subarrays (e.g., $y_1, y_2, \ldots, y_N$) to $\theta_k$ using a delay-and-sum (DAS) beamformer. The DAS beamformer weight vector, $w_k$, is equivalent to the first-dimension steering vector, $s_k$ (e.g., k=1, 2, . . . , K). The beamforming-based approach based on a robust beamformer effectively suppresses interference by reconstructing its covariance matrix. Because other first angles are treated as interference when analyzing the first angle 306-k, $\theta_k$, the beamforming-based technique can efficiently determine the second-dimension information.

At 502, the angle-estimation module 116 can determine the interference subspace. The angle-estimation module 116 can determine the weight vector using Equation (7):

$$w_k = \frac{R_k^{-1} s_k}{s_k^H R_k^{-1} s_k} \tag{7}$$

The steering vector $s_k$ is associated with the first angle 306, $\theta_k$. The angle-estimation module 116 can then determine the interference covariance matrix using the other first angles 306 as illustrated by Equation (8):

$$R_k = \sum_{i=1, i \neq k}^{K} p_i s_i s_i^H + \eta I_M, \tag{8}$$

where $p_1, p_2, \ldots, p_K$ are the signal power of first-dimension angles $\theta_1, \theta_2, \ldots, \theta_K$, respectively, $\eta$ is the noise power, and $I_M$ is an M×M identity matrix. The interference covariance matrix can be rewritten or reconstructed as illustrated by Equation (9):

$$R_k = U_k \Lambda_k U_k^H + \eta I_M. \tag{9}$$

where $U_k = [s_1, s_2, \ldots, s_{k-1}, s_{k+1}, \ldots, s_K] \in \mathbb{C}^{M \times (K-1)}$, which represents the interference subspace, and $\Lambda_k$ is a diagonal matrix as illustrated by Equation (10):

$$\Lambda_k = \begin{bmatrix} p_1 & & & & & \\ & \ddots & & & & \\ & & p_{k-1} & & & \\ & & & p_{k+1} & & \\ & & & & \ddots & \\ & & & & & p_K \end{bmatrix} \tag{10}$$

At 504, the angle-estimation module 116 can estimate the signal power and noise power. The signal power, $p_k$, and the noise power, $\eta$, can be obtained using the first angles 306 from operation 304 of FIG. 3. If the first angles 306 cannot provide this information, the angle-estimation module 116 can estimate the signal power and noise power using the 2D array data Y. Specifically, letting $S=[s_1, s_2, \ldots, s_K] \in \mathbb{C}^{M \times K}$, the amplitudes of the signal are given by Equation (11):

$$A = (S^H S)^{-1} S^H Y \tag{11}$$

and the signal power can be determined using Equation (12):

$$p_k = \sum_{n=1}^{N} |A_{k,n}|^2 / N \tag{12}$$

where $A_{k,n}$ is the element in the k-th row and n-th column of matrix A. The angle-estimation module 116 can estimate the noise power using Equation (13):

$$\eta = \frac{\|Y - SA\|_F^2}{MN} \tag{13}$$

where $\|\cdot\|_F^2$ stands for the Frobenius norm of a matrix.

At 506, the angle-estimation module 116 can determine the inverse of the interference covariance matrix using the Woodbury matrix identity. The complexity of the weight vector, $w_k$, is dominated by the inversion of the M×M matrix interference covariance matrix, $R_k$. Application of the Woodbury matrix identity to $R_k$ is illustrated by Equation (14):

$$R_k^{-1} = \frac{1}{\eta}\left(I_M - U_k\left(U_k^H U_k + \eta \Lambda_k^{-1}\right)^{-1} U_k^H\right) \tag{14}$$

The complexity of the weight vector is reduced using the inversion of a (K−1)×(K−1) matrix and some efficient linear operations. The angle-estimation module 116 can then estimate the second-dimension information, $z_k$, associated with first-dimension angle $\theta_k$ using Equation (15):

$$z_k = [w_k^H y_1, w_k^H y_2, \ldots, w_k^H y_N]^T \tag{15}$$

At 508, the angle-estimation module 116 estimates second angles, $\emptyset_k, \emptyset'_k, \ldots, \emptyset'''_k$, associated with the first angle 306-k, $\theta_k$. Using the second-dimension information, $z_k$, the angle-estimation module 116 estimates the second angles using a single-snapshot approach, including phase compare, FFT, and NLS techniques.

Example Method

Figure 6:
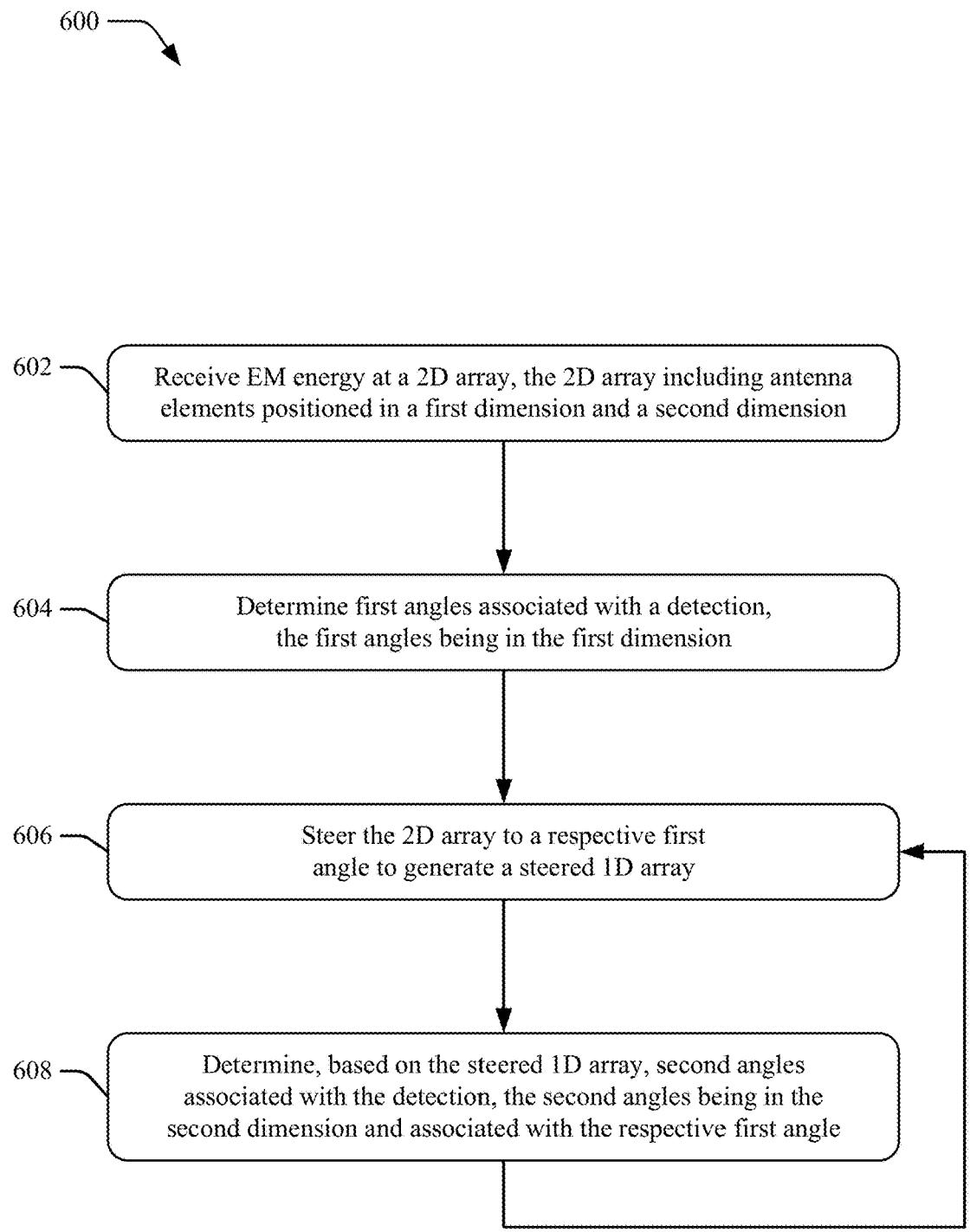
FIG. 6 illustrates an example method of a radar system to perform sequential 2D angle estimation.

FIG. 6 illustrates an example method 600 of the radar system 102 to perform sequential 2D angle estimation. Method 600 is shown as sets of operations (or acts) performed, but not necessarily limited to the order or combinations in which the operations are shown herein. Further, any one or more of the operations may be repeated, combined, or reorganized to provide other methods. In portions of the following discussion, reference may be made to the environment 100 of FIG. 1, and entities detailed in FIGS. 1 through 5, reference to which is made for example only. The techniques are not limited to performance by one entity or multiple entities.

At 602, an antenna of a radar system receives EM energy at a 2D array reflected by one or more objects. The 2D array includes at least four antenna elements positioned in a first dimension and a second dimension. For example, the antenna 110 of the radar system 102 installed in the vehicle 104 can receive the EM energy 302 at the 2D array 204 reflected by the one or more objects 120. The 2D array 204 includes multiple antenna elements 206 positioned in the first dimension 208 (e.g., an azimuth direction) and the second dimension 210 (e.g., an elevation direction). The first dimension 208 can be orthogonal or not orthogonal to the second dimension 210.

The antenna elements 206 of the 2D array 204 in the first dimension 208 can be unaligned with antenna elements 206 of the 2D array 204 in the second dimension 210. The antenna elements 206 of the 2D array 204 can be uniformly spaced apart by a first distance in the first dimension 208 and a second distance in the second dimension 210, with the first distance being equal to or different than the second distance.

The antenna 110 can also include the 1D array 216 or the concatenated 1D array 218. The 1D array 216 and concatenated 1D array 218 include additional antenna elements 206 not encompassed by the 2D array 204 and positioned in the first dimension 208. The 1D array 216 and the concatenated 1D array 218 can be uniform linear arrays.

At 604, first angles associated with one or more detections of the one or more objects are determined using the EM energy received at the antenna. The first angles are in the first dimension. For example, the processor 112 of the radar system 102 can determine, using the angle-estimation module 116 and the EM energy 302 received by the 2D array 204, the first angles 306 associated with detections of the objects 120. In particular, the processor 112 can use the EM energy 302 received at a subset of the antenna elements 206 of the 2D array 204 to determine the first angles 306. The subset of the antenna elements 206 can be positioned in the first dimension 208.

The processor 112 can also use EM energy received by the 1D array 216 or the concatenated 1D array 218 to determine the first angles 306. The processor 112 can determine the first angles 306 using an ESPRIT, MUSIC, or NLS based function.

At 606, for each first angle of the first angles, the 2D array is steered to the respective first angle to generate a steered 1D array. For example, the processor 112 can steer, using the first angle 306-$k$, the 2D array 204 to generate a steered 1D array. The processor 112 can perform the steering using a projection-based or a beamforming-based technique. In the projection-based technique, the processor 112 can project the EM energy 302 received at the 2D array 204 onto a subspace formed by a first-dimension steering vector associated with the respective first angle 306-$k$. The processor 112 can determine a projection matrix associated with the subspace and second-dimension information, $z_k$, associated with the respective first angle 306-$k$. The second-dimension information is used to determine the second angles associated with the respective first angle 306-$k$.

In the beamforming-based technique, the processor 112 can determine an interference subspace associated with the first angles 306. The processor can estimate a signal power associated with the first angles 306 and a noise power. The processor 112 can determine an inverse of an interference covariance matrix associated with the respective first angle using a Woodbury matrix identity to determine second-dimension information associated with the respective first angle 306-$k$. The second-dimension information is used to determine the second angles associated with the respective first angle 306-$k$.

At 608, second angles associated with the detections are determined based on the steered 1D array. The second angles are in the second dimension and associated with the respective first angle. For example, the processor 112 can determine, based on the steered 1D array, second angles associated with the detection. The second angles are in the second dimension 210 and associated with the respective first angle 306-$k$. The processor can perform operations 606 and 608 in parallel or sequentially. The processor 112 can determine the second angles using a phase compare, FFT, or NLS based function.

EXAMPLES

In the following section, examples are provided.

Example 1. A radar system comprising: an antenna configured to receive electromagnetic (EM) energy reflected by one or more objects, the antenna comprising a two-dimensional (2D) array that includes at least four antenna elements positioned in a first dimension and a second dimension; and one or more processors configured to: determine, using the EM energy received at the antenna, first angles associated with one or more detections of the one or more objects, the first angles being in the first dimension; for each respective first angle of the first angles: steer the 2D array to the respective first angle to generate a steered 1D array; and determine, based on the steered 1D array, second angles associated with the one or more detections, the second angles being in the second dimension and associated with the respective first angle.

Example 2. The radar system of example 1, wherein the one or more processors are configured to steer the 2D array to the respective first angle to generate the steered 1D array by: projecting the EM energy received at the 2D array onto a subspace formed by a first-dimension steering vector associated with the respective first angle; determining a projection matrix associated with the subspace; and determining second-dimension information associated with the respective first angle, the second-dimension information being used to determine the second angles associated with the respective first angle.

Example 3. The radar system of example 1 or 2, wherein the one or more processors are configured to steer the 2D array to the respective first angle to generate the steered 1D array by: determining an interference subspace associated with the respective first angle; estimating a signal power associated with the first angles and a noise power; and determining an inverse of an interference covariance matrix associated with the respective first angle using a Woodbury matrix identity to determine second-dimension information associated with the respective first angle, the second-dimension information being used to determine the second angles associated with the respective first angle.

Example 4. The radar system of any preceding example, wherein the one or more processors are configured to steer the 2D array to the respective first angle and to determine the second angles associated with the respective first angle for each respective first angle of the first angles in parallel.

Example 5. The radar system of any preceding example, wherein the one or more processors are configured to steer the 2D array to the respective first angle and to determine the second angles associated with the respective first angle for each respective first angle of the first angles sequentially.

Example 6. The radar system of any preceding example, wherein: the antenna further comprises an additional one-dimensional (1D) array including additional antenna elements not encompassed by the 2D array and positioned in the first dimension; and the one or more processors are configured to determine the first angles associated with the one or more detections using the EM energy received at the additional 1D array.

Example 7. The radar system of example 6, wherein the additional 1D array is a uniform linear array.

Example 8. The radar system of example 6 or 7, wherein: the additional antenna elements of the additional 1D array are concatenated with a subset of the antenna elements of the 2D array to form a concatenated 1D array; and the first angles associated with the one or more detections are determined using the EM energy received at the concatenated 1D array.

Example 9. The radar system of any preceding example, wherein the one or more processors are configured to: determine the first angles using at least one of an Estimation of Signal Parameters via Rotational Invariance Technique (ESPRIT), a Multiple Signal Classification (MUSIC), or a non-linear least squares (NLS) based function; and determine the second angles using at least one of a phase compare, fast Fourier transform (FFT), or NLS based function.

Example 10. The radar system of any preceding example, wherein the antenna elements of the 2D array in the first dimension are not aligned with antenna elements of the 2D array in the second dimension.

Example 11. The radar system of any preceding example, wherein the one or more processors are configured to determine the first angles associated with the one or more detections using the EM energy received at a subset of the antenna elements of the 2D array, the subset of the antenna elements positioned in the first dimension.

Example 12. The radar system of any preceding example, wherein the antenna elements of the 2D array are positioned in an azimuth direction and an elevation direction.

Example 13. The radar system of any preceding example, wherein the antenna elements of the 2D array are uniformly spaced apart by a first distance in the first dimension and a second distance in the second dimension, the first distance being equal to or different than the second distance.

Example 14. The radar system of any preceding example, wherein the second dimension is orthogonal to the first dimension.

Example 15. The radar system of any preceding example, wherein the second dimension is not orthogonal to the first dimension.

Example 16. The radar system of any preceding example, wherein the radar system is configured to be installed on an automobile.

Example 17. A computer-readable storage media comprising computer-executable instructions that, when executed, cause a processor of a radar system to: receive, by an antenna of the radar system, electromagnetic (EM) energy reflected by one or more objects; determine, using the EM energy received by a two-dimensional (2D) array of the antenna, first angles associated with one or more detections of one or more objects, the 2D array comprising at least four antenna elements positioned in a first dimension and a second dimension, the first angles being in the first dimension; for each respective first angle of the first angles: steer the 2D array to the respective first angle to generate a steered 1D array; and determine, based on the steered 1D array, second angles associated with the one or more detections, the second angles being in the second dimension and associated with the respective first angle.

Example 18. The computer-readable storage media of example 17, wherein the computer-readable storage media comprising additional computer-executable instructions that, when executed, cause the processor to steer the 2D array to the respective first angle to generate the steered 1D array by: projecting the EM energy received at the 2D array onto a subspace formed by a first-dimension steering vector associated with the respective first angle; determining a projection matrix associated with the subspace; and determining second-dimension information associated with the respective first angle, the second-dimension information being used to determine the second angles associated with the respective first angle.

Example 19. The computer-readable storage media of example 17 or 18, wherein the computer-readable storage media comprising additional computer-executable instructions that, when executed, cause the processor to steer the 2D array to the respective first angle to generate the steered 1D array by: determining an interference subspace associated with the respective first angle; estimating a signal power associated with the first angles and a noise power; and determining an inverse of an interference covariance matrix associated with the respective first angle using a Woodbury matrix identity to determine second-dimension information associated with the respective first angle, the second-dimension information being used to determine the second angles associated with the respective first angle.

Example 20. A method comprising: receiving, by an antenna of a radar system, electromagnetic (EM) energy reflected by one or more objects; determining, using the EM energy received by a two-dimensional (2D) array of the antenna, first angles associated with one or more detections of one or more objects, the 2D array comprising at least four antenna elements positioned in a first dimension and a second dimension, the first angles being in the first dimension; for each respective first angle of the first angles: steering the 2D array to the respective first angle to generate a steered 1D array; and determining, based on the steered 1D array, second angles associated with the one or more detections, the second angles being in the second dimension and associated with the respective first angle.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:
1. A radar system comprising:
an antenna configured to receive electromagnetic (EM) energy reflected by one or more objects, the antenna comprising a two-dimensional (2D) array that includes at least four antenna elements positioned in a first dimension and a second dimension; and
one or more processors configured to:
determine, using the EM energy received at the antenna, first angles associated with one or more detections of the one or more objects, the first angles being in the first dimension;

for each respective first angle of the first angles:
steer the 2D array to the respective first angle to generate a steered 1D array by:
projecting the 2D array onto a subspace formed by a first-dimension steering vector associated with the respective first angle,
determining a projection matrix associated with the subspace formed by the first-dimension steering vector, and
determining second-dimension information associated with the respective first angle based on the projection matrix associated with the subspace formed by the first-dimension steering vector, the second-dimension information being used to determine the second angles associated with the respective first angle; and
determine, based on the steered 1D array, second angles associated with the one or more detections, the second angles being in the second dimension and associated with the respective first angle.

2. The radar system of claim 1, wherein the one or more processors are configured to steer the 2D array to the respective first angle to generate the steered 1D array by:
determining an interference subspace associated with the respective first angle;
estimating a signal power associated with the first angles and a noise power; and
determining an inverse of an interference covariance matrix associated with the respective first angle using a Woodbury matrix identity to determine second-dimension information associated with the respective first angle, the second-dimension information being used to determine the second angles associated with the respective first angle.

3. The radar system of claim 1, wherein the one or more processors are configured to steer the 2D array to the respective first angle and to determine the second angles associated with the respective first angle for each respective first angle of the first angles in parallel.

4. The radar system of claim 1, wherein the one or more processors are configured to steer the 2D array to the respective first angle and to determine the second angles associated with the respective first angle for each respective first angle of the first angles sequentially.

5. The radar system of claim 1, wherein:
the antenna further comprises an additional one-dimensional (1D) array including additional antenna elements not encompassed by the 2D array and positioned in the first dimension; and
the one or more processors are configured to determine the first angles associated with the one or more detections using the EM energy received at the additional 1D array.

6. The radar system of claim 5, wherein the additional 1D array is a uniform linear array.

7. The radar system of claim 5, wherein:
the additional antenna elements of the additional 1D array are concatenated with a subset of the antenna elements of the 2D array to form a concatenated 1D array; and
the first angles associated with the one or more detections are determined using the EM energy received at the concatenated 1D array.

8. The radar system of claim 1, wherein the one or more processors are configured to:
determine the first angles using at least one of an Estimation of Signal Parameters via Rotational Invariance Technique (ESPRIT), a Multiple Signal Classification (MUSIC), or a non-linear least squares (NLS) based function; and
determine the second angles using at least one of a phase compare, fast Fourier transform (FFT), or NLS based function.

9. The radar system of claim 1, wherein the antenna elements of the 2D array are not vertically aligned.

10. The radar system of claim 1, wherein the one or more processors are configured to determine the first angles associated with the one or more detections using the EM energy received at a subset of the antenna elements of the 2D array, the subset of the antenna elements positioned in the first dimension.

11. The radar system of claim 1, wherein the antenna elements of the 2D array are positioned in an azimuth direction and an elevation direction.

12. The radar system of claim 1, wherein the antenna elements of the 2D array are uniformly spaced apart by a first distance in the first dimension and a second distance in the second dimension, the first distance being equal to or different than the second distance.

13. The radar system of claim 1, wherein the second dimension is orthogonal to the first dimension.

14. The radar system of claim 1, wherein the second dimension is not orthogonal to the first dimension.

15. The radar system of claim 1, wherein the radar system is configured to be installed on an automobile.

16. Non-transitory computer-readable storage media comprising computer-executable instructions that, when executed, cause a processor of a radar system to: receive, by an antenna of the radar system, electromagnetic (EM) energy reflected by one or more objects; determine, using the EM energy received by a two-dimensional (2D) array of the antenna, first angles associated with one or more detections of one or more objects, the 2D array comprising at least four antenna elements positioned in a first dimension and a second dimension, the first angles being in the first dimension; for each respective first angle of the first angles: steer the 2D array to the respective first angle to generate a steered 1D array by projecting the 2D array onto a subspace formed by a first-dimension steering vector associated with the respective first angle, determining a projection matrix associated with the subspace formed by the first-dimension steering vector, and determining second-dimension information associated with the respective first angle based on the projection matrix associated with the subspace formed by the first-dimension steering vector, the second-dimension information being used to determine the second angles associated with the respective first angle; and determine, based on the steered 1D array, second angles associated with the one or more detections, the second angles being in the second dimension and associated with the respective first angle.

17. The non-transitory computer-readable storage media of claim 16, wherein the computer-readable storage media comprising additional computer-executable instructions that, when executed, cause the processor to steer the 2D array to the respective first angle to generate the steered 1D array by: determining an interference subspace associated with the respective first angle; estimating a signal power associated with the first angles and a noise power; and determining an inverse of an interference covariance matrix associated with the respective first angle using a Woodbury matrix identity to determine second-dimension information associated with the respective first angle, the second-dimension information being used to determine the second angles associated with the respective first angle.

18. A method comprising:
receiving, by an antenna of a radar system, electromagnetic (EM) energy reflected by one or more objects;
determining, using the EM energy received by a two-dimensional (2D) array of the antenna, first angles associated with one or more detections of one or more objects, the 2D array comprising at least four antenna elements positioned in a first dimension and a second dimension, the first angles being in the first dimension;
for each respective first angle of the first angles:
steering the 2D array to the respective first angle to generate a steered 1D array by:
projecting the 2D array onto a subspace formed by a first-dimension steering vector associated with the respective first angle,
determining a projection matrix associated with the subspace formed by the first-dimension steering vector, and determining second-dimension information associated with the respective first angle based on the projection matrix associated with the subspace formed by the first-dimension steering vector, the second-dimension information being used to determine the second angles associated with the respective first angle; and
determining, based on the steered 1D array, second angles associated with the one or more detections, the second angles being in the second dimension and associated with the respective first angle.

* * * * *

UNITED STATES PATENT AND TRADEMARK OFFICE
CERTIFICATE OF CORRECTION

PATENT NO. : 12,216,227 B2  
APPLICATION NO. : 17/652625  
DATED : February 4, 2025  
INVENTOR(S) : Xin Zhang et al.

Page 1 of 1

It is certified that error appears in the above-identified patent and that said Letters Patent is hereby corrected as shown below:

On the Title Page

Page 2, Column 2, item (56) Other Publications, Line 69: Delete "Msentin," and insert --Visentin,--

In the Claims

Column 16, Line 32: In Claim 16, after "to:", insert --¶--

Column 16, Line 34: In Claim 16, after "objects;", insert --¶--

Column 16, Lines 39-40: In Claim 16, after "dimension;", insert --¶--

Column 16, Line 40: In Claim 16, after "angles:", insert --¶--

Column 16, Line 42: In Claim 16, delete "by" and insert --by:¶--

Column 16, Line 44: In Claim 16, after "angle,", insert --¶--

Column 16, Line 46: In Claim 16, after "and", insert --¶--

Column 16, Line 51: In Claim 16, after "and", insert --¶--

Column 16, Line 61: In Claim 17, after "by:", insert --¶--

Column 16, Line 62: In Claim 17, after "angle;", insert --¶--

Column 16, Line 63: In Claim 17, after "and", insert --¶--

Column 17, Line 20: In Claim 18, after "and", insert --¶--

Signed and Sealed this  
Fifteenth Day of April, 2025

Coke Morgan Stewart  
*Acting Director of the United States Patent and Trademark Office*